United States Patent Office 3,609,944
Patented Oct. 5, 1971

3,609,944
WASTE REMOVAL APPARATUS FOR SPINNING MILLS
Rudolf Wildbolz and Max Meier, Winterthur, Switzerland, assignors to Rieter Machine Works Ltd., Winterthur, Switzerland
Filed June 17, 1969, Ser. No. 833,947
Claims priority, application Switzerland, June 19, 1968, 9,459/68
Int. Cl. B01d 50/00
U.S. Cl. 55—215                    8 Claims

ABSTRACT OF THE DISCLOSURE

The waste separator includes a separator which consists of a fabric filter to filter out the waste into a helical worm which rotates between the separator and detachable waste container. The helical worm transfers the waste into the container and thereafter compresses the waste in the container. The container can be mounted on an elastically deformable plate which permits the waste weight in the container to activate a switch below the plate for shifting the air flow into another waste separator.

---

This invention relates to a waste removal apparatus. More particularly, this invention relates to a waste removal apparatus for spinning mill waste.

The automation of opening and cleaning equipment in present day spinning mills has necessarily created a problem in waste removal. Heretofore, the waste which has accumulated has been carried away from the machinery of the mills in various manners. In some instances, the waste has been deposited in a special room provided for such. However, these rooms have required emptying of the accumulated waste from time to time. Further, in order to empty the rooms, manual labor and operations have been used. For example, the rooms have been emptied manually by filling the waste material into sacks using shovels or forks. As a result, waste elimination at the machines had to be interrupted especially if no other waste room was available or, in the worst case, the entire opening and cleaning plant connected to the waste room had to be shut down in order to permit removal. In other instances, in order to reduce personnel and to avoid downtime of an entire plant or part of a plant, cyclone dust separators have been used of late. These cyclone dust separators have been combined with a sack holding device so that the dust waste which is separated from the air in the cyclone separator can be deposited directly into a sack held by the sack holding device. Furthermore, these cyclone separators have been used in multiple arrays so that after one sack has been filled, the waste is directed into a second cyclone separator and the filled sack at the first cyclone separator is replaced by an empty sack. During the operation of these latter waste separators, the air which carries the waste escapes through the sack to the surrounding room so long as the sack is empty or contains a small quantity of waste. In a sense, the sack functions as a filter. However, since the air permeability diminishes as the contents of the sack increases, the static pressure inside the separator also increases. This increase in pressure is disadvantageous for the whole pneumatic system of the plant, as the suction power of the suction nozzles at the opening and cleaning machines necessarily diminishes considerably. Thus, impeccable cleaning action at the machines has not been ensured.

In order to keep the pressure drop in the pneumatic system within reasonable limits, a pressostat is provided in the pneumatic system to switch the flow of air entrained waste from the filled separator to an empty separator by means of a pneumatic valve. This arrangement, however, has been complicated and has a further disadvantage in that the air permeability, and thus the pressure inside the sack, depends on the quality of the sack fabric used. That is, a dense sack fabric will cause greater pressure increases and thus switching to the next cyclone sooner than a coarse sack fabric.

These above methods of filling waste sacks thus are imperfect and economically unfavorable.

Accordingly, it is an object of the invention to achieve a high filling density in waste sacks of a waste separator at a constant pressure in the pneumatic system connected with the waste separator.

It is another object of the invention to automatically cut out the flow of waste into a waste sack in dependence upon the weight of waste in the waste sack.

It is another object of the invention to provide a waste separator which is simple to use and which is economically favorable.

It is another object of the invention to provide a waste separator which requires a minimum of manual labor in use.

Briefly, the invention provides a waste separator which is constructed with a separator for the separation of waste from a carrier air flow emanating from a spinning mill, a waste container below the separator for receiving the separated waste, and a means for transferring the waste into the container and for compressing the waste in the container after a predetermined amount has been deposited in the container.

The separator is constructed so that the carrier air passes from the separator while the waste is filtered out within the separator. To this end, the separator consists of a cylindrically shaped fabric dust filter which is mounted in an untensioned manner. The loose mounting of the filter allows the turbulent air which passes through to vibrate the filter so that the waste accumulated on the filter is shaken loose.

The waste container is constructed so as to be detachably mounted on the underside of the separator so as to receive the deposited waste.

The means for transferring and compressing the waste is positioned between the separator and waste container and includes a rotatable helical worm. This worm is further surrounded by a casing which is rotatably mounted in a housing containing the separator so that the worm can be rotated from without.

The waste separator is further constructed with an elastically deformable element in the separator housing to support the waste container such that the element can deflect under the weight of the waste in the container. This element is associated with a switch which is normally spaced from the element so that when the element deflects under a predetermined weight, the switch becomes activated to cut out the waste supply to the separator, for example, by causing the waste supply to be shunted to another separator.

These and other objects and advantages of the invention will become more apparent from the following detailed

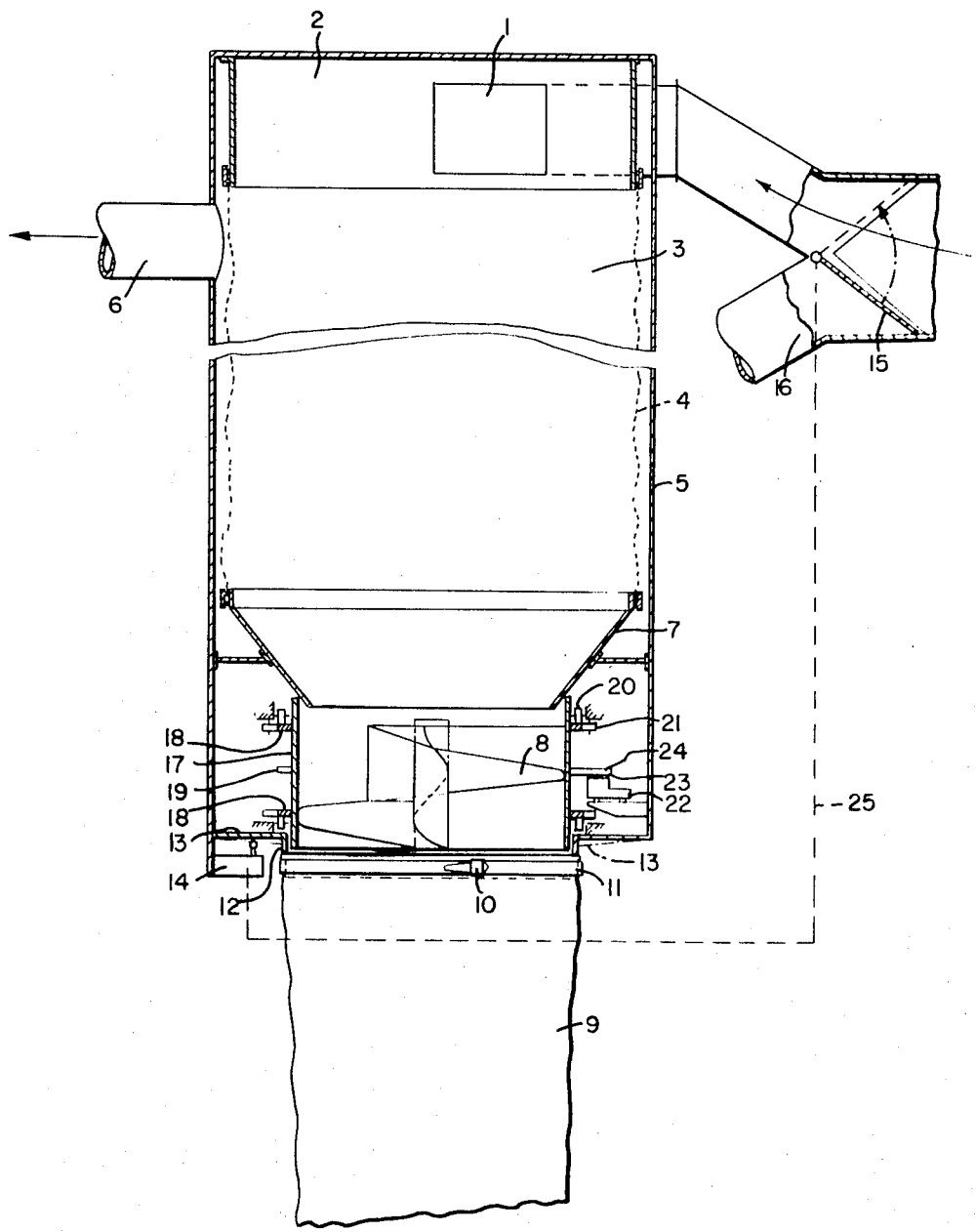

rounding and secured to said worm and transferring means for rotating said casing.

References Cited

UNITED STATES PATENTS

| | | | |
|---|---|---|---|
| 371,609 | 10/1887 | Marr | 198—215 X |
| 971,390 | 9/1910 | Matchette | 55—366 |
| 1,417,052 | 5/1922 | Gasteiger | 55—430 |
| 1,680,243 | 8/1928 | Becker | 55—459 X |
| 383,801 | 5/1888 | Downton | 55—430 |
| 1,163,318 | 12/1915 | Bryant | 55—293 |
| 3,282,515 | 11/1966 | Smith | 209—144 |
| 1,170,438 | 2/1916 | Fahrney | 55—429 |
| 1,176,721 | 3/1916 | Zimmer | 55—293 |
| 2,496,180 | 10/1945 | Smith et al. | 55—215 |
| 2,886,900 | 4/1955 | Flannery | 55—429 X |

FOREIGN PATENTS 518,105   2/1940   Great Britain.

FRANK W. LUTTER, Primary Examiner

B. NOZICK, Assistant Examiner

U.S. Cl. X.R.

55—337, 418, 430